United States Patent
Siebers

(10) Patent No.: US 10,172,271 B2
(45) Date of Patent: Jan. 8, 2019

(54) PIVOTING SUPPORT WHEEL FOR MOUNTING ON A PLOW FRAME

(71) Applicant: LEMKEN GMBH & CO KG, Alpen (DE)

(72) Inventor: Josef Siebers, Xanten (DE)

(73) Assignee: LEMKEN GMBH & CO KG, Alpen (DE)

( * ) Notice: Subject to any disclaimer, the term of this patent is extended or adjusted under 35 U.S.C. 154(b) by 0 days.

(21) Appl. No.: 15/324,732

(22) PCT Filed: Jul. 9, 2015

(86) PCT No.: PCT/DE2015/100292
§ 371 (c)(1),
(2) Date: Jan. 9, 2017

(87) PCT Pub. No.: WO2016/004926
PCT Pub. Date: Jan. 14, 2016

(65) Prior Publication Data
US 2017/0202127 A1 Jul. 20, 2017

(30) Foreign Application Priority Data
Jul. 9, 2014 (DE) .................... 10 2014 109 605

(51) Int. Cl.
*A01B 3/46* (2006.01)
*A01B 3/42* (2006.01)
(Continued)

(52) U.S. Cl.
CPC .............. *A01B 3/464* (2013.01); *A01B 3/42* (2013.01); *A01B 15/00* (2013.01); *A01B 63/02* (2013.01); *A01B 63/10* (2013.01)

(58) Field of Classification Search
CPC .......... A01B 3/46; A01B 3/462; A01B 3/464; A01B 3/466; A01B 63/16; A01B 63/166; A01B 63/22
See application file for complete search history.

(56) References Cited

U.S. PATENT DOCUMENTS 2,869,653 A * 1/1959 Smith .................... A01B 3/464
172/212
3,087,556 A * 4/1963 Pursche ................. A01B 3/464
172/211
(Continued)

FOREIGN PATENT DOCUMENTS

| CN | 2741333 Y | 11/2005 |
| DE | 2545009 C3 | 4/1977 |

(Continued)

*Primary Examiner* — Matthew D. Troutman
(74) *Attorney, Agent, or Firm* — Soroker Agmon Nordman PTE LTD

(57) ABSTRACT

A rotary plow (1) with pivoting support wheel (2) for mounting on a plow frame (3). The pivoting support wheel (2) is suitable for plows projecting far behind, such as multi-plowbody mounted, reversible plows or semi-mounted reversible plows with a movable rear part. Furthermore, the pivoting support wheel (2) exhibits self-steering characteristics which have different support or steering forces which act on the pivoting support wheel (2) or the plow frame (3) through the pushed or forwardly-directed arrangement of the pivot arm, and thus enables an accurate lateral guidance of the plow.

10 Claims, 7 Drawing Sheets

(51) Int. Cl.
*A01B 15/00* (2006.01)
*A01B 63/02* (2006.01)
*A01B 63/10* (2006.01)

(56) References Cited

U.S. PATENT DOCUMENTS

| | | | | |
|---|---|---|---|---|
| 3,106,252 A | * | 10/1963 | Mydels | A01B 3/464 |
| | | | | 172/212 |
| 3,219,125 A | * | 11/1965 | Wenzel | A01B 3/421 |
| | | | | 172/225 |
| 3,356,161 A | * | 12/1967 | Mirus | A01B 3/464 |
| | | | | 172/212 |
| 3,428,135 A | * | 2/1969 | Richey | A01B 3/421 |
| | | | | 172/212 |
| 3,448,815 A | * | 6/1969 | Roberson | A01B 3/46 |
| | | | | 172/291 |
| 3,532,172 A | * | 10/1970 | Richey | A01B 3/464 |
| | | | | 172/212 |
| 3,589,451 A | * | 6/1971 | Wenzel | A01B 3/46 |
| | | | | 172/285 |
| 4,098,346 A | * | 7/1978 | Stanfill | A01B 3/46 |
| | | | | 172/141 |
| 4,186,806 A | | 2/1980 | Ward | |
| 4,691,785 A | * | 9/1987 | Post | A01B 63/22 |
| | | | | 172/212 |

FOREIGN PATENT DOCUMENTS

| | | | | |
|---|---|---|---|---|
| DE | 2554273 C2 | | 6/1977 | |
| DE | 7538474 U1 | | 2/1980 | |
| DE | 3033791 | | 3/1982 | |
| DE | 8532966 | | 1/1986 | |
| DE | 29919028 | | 12/1999 | |
| DE | 102013106783 B4 | * | 8/2017 | A01B 3/28 |
| EP | 181947 | | 5/1986 | |
| EP | 0577353 | | 1/1994 | |
| FR | 1393243 A | * | 3/1965 | A01B 3/464 |
| FR | 2598056 A1 | * | 11/1987 | A01B 63/1115 |
| GB | 752103 A | * | 7/1956 | A01B 3/464 |
| JP | Y4426730 | | 11/1969 | |
| JP | S4528242 | | 10/1970 | |
| JP | S52153602 U | | 11/1977 | |
| JP | S6189214 U | | 6/1986 | |
| JP | H0693805 B | | 11/1994 | |
| JP | H1118501 A | | 1/1999 | |
| UA | 71069 U | | 6/2012 | |
| WO | 2010108468 | | 9/2010 | |

\* cited by examiner

PIVOTING SUPPORT WHEEL FOR MOUNTING ON A PLOW FRAME

RELATED APPLICATIONS

The present application claims priority as a US national phase under 35 U.S.C. 363 of PCT/DE2015/100292 filed on Jul. 9, 2015, the disclosure of which is incorporated herein by reference.

FIELD OF THE INVENTION

The invention relates to a pivoting support wheel for mounting on a plow frame of a rotary plow for plows, which are projecting far behind and the pivoting support wheel exhibits self-steering characteristics.

BACKGROUND OF THE INVENTION

Rotary plows are usually provided with support wheels on the plow frame to provide a distance of the plow frame from the ground surface and thus the penetration depth of the plow tools into the ground. Since the plow frame is angled obliquely to the direction of travel in the working position, support wheels pivot in the direction of travel during the rotary movement of the plow frame. In their pivoting movement, these require a smaller clearance with respect to the plow frame than support wheels which pivot in the opposite direction to the direction of travel if these are not arranged at the end of the plow frame. In principle, however, the pivot arm of these support wheels is inclined backwards in the working position, since self-stabilization and self-alignment of the wheels takes place precisely with changing forces on the support wheels. This improves or makes possible a stable and exact lateral guidance of the plow tools, as shown in the German patent application DE 30 33 791. In order to move the pivot arm backwards when the support wheel is placed on the ground in forwards travel, the support wheel is provided with an extension as a ground spike or it is provided with a braking device or the like, as for example disclosed in DE 75 38 474 U1 or DE 25 54 273 C2. A further pendulum support wheel as disclosed in DE 25 45 009 C3 may be perpendicularly pivoted about an axis in order to serve as a freely-rotating transport wheel in a middle transport position of the plow frame. Since these support wheels occasionally pivot forward upon touching the ground and do not fulfill their depth control function, support wheels have been implemented which basically pivot counter to the direction of travel, but need a larger pivoting clearance relative to the plow frame, but which then lacks ground clearance when turning the lifted plow. The German utility model DE 8532966 U1 proposes a pendulum support wheel, which is arranged behind the plow frame. In order to allow for boundary plowing, the support wheel may be temporarily folded forward about a vertical axis. As previously described, however, this displaced position causes an unstable lateral guidance of the plow tools, which leaves a bad and uneven plow pattern in the final furrow. The German utility model DE 299 19 028 U1 proposes a pushed support wheel with the same disadvantages.

It is an object of the invention to provide a pivoting support wheel which avoids the above-mentioned drawbacks but combines the respective advantages.

SUMMARY OF THE INVENTION

This object is achieved by the features of the characterizing part of claim 1. When the plow or the plow frame is turned, the pivoting support wheel describes a semicircular segment, which, viewed from the side, lies in a front region in front of the pivot axis, through the movement of the pivot arm and thus of the pivoting support wheel exclusively in the direction of travel, i.e. in the direction of the towing vehicle. The pivoting support wheel thus always remains in a pushed position and may be fixed in the working position by at least one limit stop until the next pivoting operation. As a result of the preferably free, or at least partially free, rotation of the pivot arm or the pivoting support wheel about the second axis, which is preferably at least approximately perpendicular to the first axis, the support wheel exhibits self-steering characteristics which have different support or steering forces which act on the support wheel or the plow frame through the pushed or forwardly-directed arrangement of the pivot arm, and thus enable an exact lateral guidance of the plow.

In an extended embodiment, the pivoting movement of the arm or the support wheel about the second axis is shifted from a middle position to the right and to the left at a pivot angle of a maximum of 60°. By means of this limitation, the support wheel can not deflect completely freely to the left or right, but rather from the middle part, which forms the optimum direction of travel of the support wheel during plowing work. When the support wheel is placed on the ground at the beginning of the plowing work, the freely-pivoting wheel quickly pivots into the middle section. The limitation may be accomplished by stops or by spring means. The latter have the advantage that the support wheel is already placed prelaligned on the ground in the direction of travel, but may pivot against the spring force.

If, as described above, the rotation angle of the support wheel is limited to a pivoting angle of a maximum of 20° outside the middle section, the lateral steerability is restricted, but the lateral pivoting of the support wheel from the plow frame is reduced.

The space requirement of the pivoting support wheel may be moved still further into the plow frame or arranged further back on the plow frame.

In an improved embodiment, the arm or the pivot bearing is designed to be telescopic or displaceable in the direction of the second axis. In addition to the pivot stops about the first axis, a further fine adjustment facility is provided for the working depth adjustment of the plow bodies. It is expedient to push the pivot arm through the pivot bearing, which forms the second axis, or to displace it parallel to this axis. This may be achieved by means of a telescopic tube, a link guide, but also by means of a multi-joint arrangement in the form, for example, of a parallelogram.

In another embodiment, the pivoting support wheel, the pivot bearing or the pivot arm is mounted to pivot about a third axis which is arranged approximately perpendicular to the ground surface or to the plane of symmetry of the plow frame. This design enables the angles of the device to the plow frame to be adjusted to different angles of the plow frame relative to the direction of travel as viewed from above.

In a simple embodiment, the third axis, about which the pivot support wheel, the pivot bearing or the pivot arm is mounted to pivot, corresponds to the pivot axis of a plow body or pair of plow bodies. As a result of this design, the pivot bearing of the plow body may be used to adjust the latter's cutting width as a pivot bearing for angular adjustment of the pivoting support wheel with respect to the plow frame when viewed from above. As a result, the device always remains parallel to the plow tool and thus to the direction of travel.

In a particularly operationally reliable embodiment of the invention, means are arranged on the arm or on the plow frame to limit the pivoting speed of the pivoting support wheel about the first and/or second axis. For example, the dynamics which occur during the turning of the entire plow frame and thus during the pivoting of the support wheel is dampened by damping cylinders, friction disks or other suitable elements.

In a convenient embodiment according to the invention, the pivoting movement of the pivoting support wheel about the first and/or second axis is supported or blocked by at least one external power device.

For example, the pivoting operation of the support wheel may be affected by a hydraulic cylinder in a time-controlled and defined manner during the turning of the plow. In addition, remote actuation, for example, through hydraulic cylinders or other servomotors also allows convenient working depth adjustment of the plow bodies during travel by changing the pivot angle of the pivoting support wheel about the first axis.

In another embodiment, the movement of the pivoting support wheel or the arm about the second axis may be fixed through locking means in a position at 90° to the middle position. By means of this arrangement, the support wheel may be fixed about the second axis into a position parallel to the plane of symmetry of the plow frame. In the case of a middle transport position of the plow frame, the pivoting support wheel may follow around the first axis and carry part of the plow weight during road travel when the pivot angle limiter about the first axis is deactivated.

In a preferred form of the invention, the pivoting support wheel is mounted near the last, or next to last, plow body. The further the pivoting support wheel is from the towing tractor, the more plow weight may be taken up by the three-point linkage of the tractor instead of via the support wheel, by increasing loading on the rear axle of the tractor.

This supporting wheel arrangement is particularly suitable for plows projecting far behind, such as multi-plow-body mounted reversible plows or semimounted reversible plows with a movable rear part.

The invention is distinguished in particular by the fact that the space required for the support wheel of a plow as a result of using a pushed pivoting support wheel, may be reduced both with respect to the plow frame and its attachments as well as with respect to the ground surface during the pivoting or turning process. In addition, border plowing close to fencing or road boundaries is facilitated by the pushed support wheel which is less laterally prominent to the direction of travel. Due to the smaller lateral prominence of the pivoting support wheel, levers, arms, brackets and bearings may also be designed to be smaller, lighter and more cost-effective.

BRIEF DESCRIPTION OF THE DRAWINGS

Further details and advantages of the subject matter of the invention may be gathered from the following description and the associated drawings, wherein an exemplary embodiment with the necessary details is shown.

DETAILED DESCRIPTION OF THE INVENTION

Figure 1:
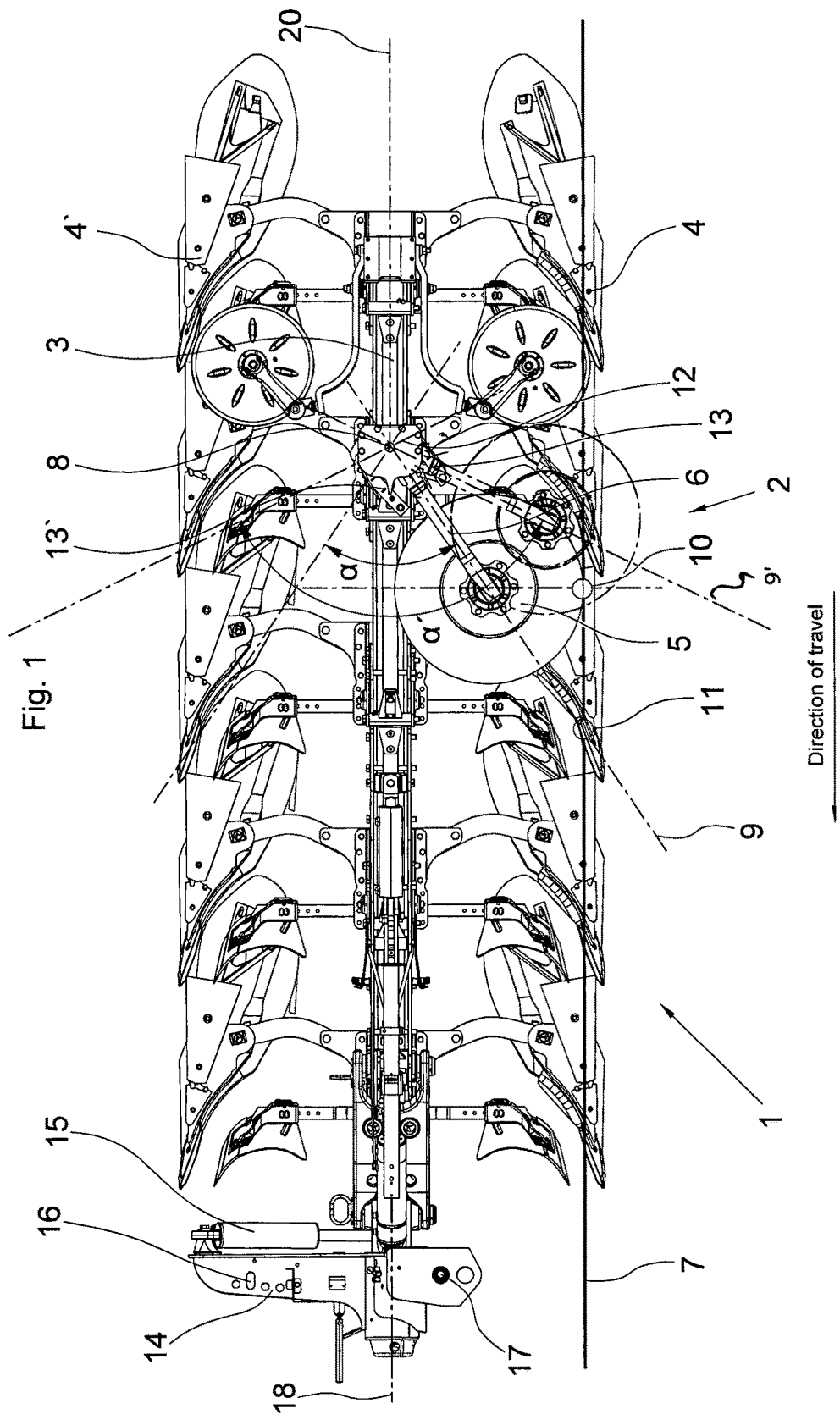
FIG. 1 shows a rotary plow construction in a side elevation view from the left

FIG. 1 shows a rotary plow 1 in a side view. This is a rotary plow construction, which is coupled via the mounting frame 14 as well as its upper and lower coupling points 16, 17 to the three-point linkage of a towing tractor (not shown) which carries and pulls the rotary plow. The rotary plow 1 may be moved from a lowered work position into a raised position for transporting or turning the plow via the three-point linkage of a towing tractor. In order to turn the plow, the plow frame 3 is pivotable by means of a hydraulic cylinder 15 or other devices through an angle of approximately 180° from a right-handed position to a left-handed position about an axis of rotation 18 which is rotatably mounted in the mounting frame 14. For this purpose, the hydraulic cylinder 15 is connected on one side to the mounting frame 14, while it is pivotally connected to the plowing frame 3 at its other end via a lever at a distance from the axis 18. In a middle position, the plow frame 3 may be locked with the mounting frame 14, for example, via a locking pin for transport purposes. A plurality of right-handed and left-handed plow tools 4, 4' are fastened to the plow frame 3 at a distance behind one another. Right-handed and a left-handed plow tools 4, 4' respectively form a preferably symmetrically-constructed fixing unit above the middle plane 20 of the plow frame 4. In the working position, the rotary plow 1 is drawn through the ground in the direction of travel. The direction of travel of the tractor pulling the plow in the working position is designated as the direction of travel. The plow tools 4, 4' accordingly cut a part of the ground below the ground surface 7 and turn it to the side. In the front region, the working depth of the plow tools is predetermined by the three-point linkage of the towing tractor and, in the rear region, by the position of the support wheel 2 between the ground surface 7 and the plow frame 3. The distance of the support wheel 5 from the middle plane 20 of the plow frame 3 or from the ground surface 7 may be adjusted by a change in the angle of incidence (½ α) of the pivot arm 6 which is spanned by the axis 9 and the middle plane 20, which preferably intersects the plow frame 3 horizontally and symmetrically 7. In this way, the maximum working depth in the ground of the plow bodies 4, 4' is changed. The angular position may be set as the end position in the working position by means of the abutment means 13, 13'. The abutment means 13, 13' may be designed as variable-length threaded spindles, combinations of perforated strips and locking pins, but also as unlockable hydraulic cylinders or other single or double acting servomotors. The servomotor or hydraulic cylinder may at the same time reduce or regulate the pivoting speed. The support wheel 5 forms the wheel contact point 10 in the working position by lowering the rotary plow 1 to the ground surface 7. The intersection point 11, which is formed by the forwardly-inclined extended pivot axis 9 and the ground surface 7, is spaced from the wheel contact point 10 in the direction of travel to form a guidance point, according to which the wheel 5 follows in a self-aligning manner. The pivot angle α, which describes the movement of the support wheel in the direction of travel, should not exceed a maximum angle of 160° so that the support wheel does not pivot backwards, or remains in a vertical position. An angle of inclination a of less than 60° is also less suitable, since the intersection point 11 of the axis 9 with the ground surface 7 is then too far forward from the wheel contact point 10 and results in unstable wheel guidance.

Figure 2:
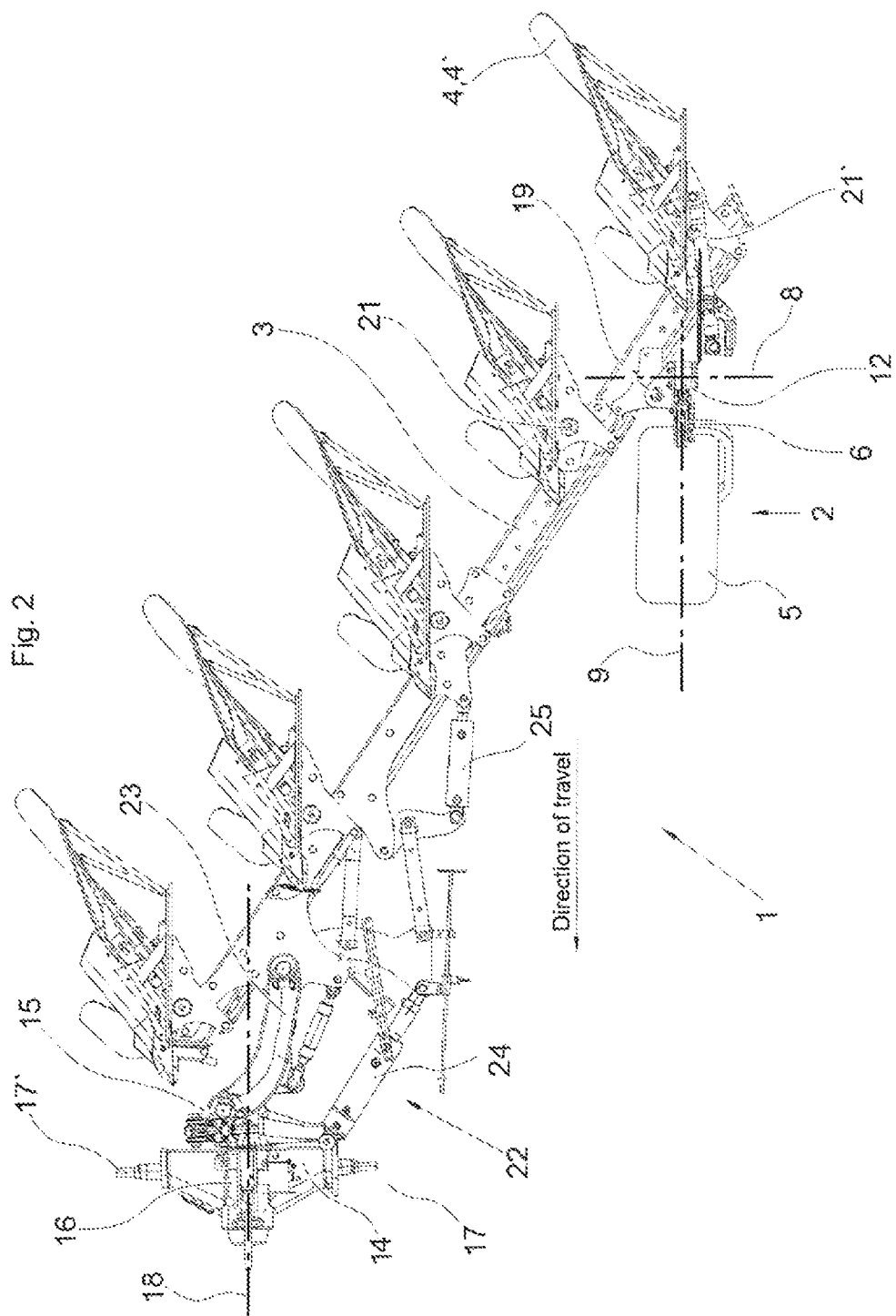
FIG. 2 shows a top plan view of a rotary plow construction

FIG. 2 shows the above-described rotary plow in plan view and in the working position. The upper and lower links (not shown) of the three-point linkage hydraulics of the tractor are attached to the mounting frame 14 at the coupling points 16, 17, 17' that are provided for this purpose. As previously described, the plow frame 3, with its plow bodies 4, 4' fastened thereto, may be pivoted about the turning axis 18 from a shown right-hand turning to a left-hand turning position, preferably by means of the hydraulic cylinder 15. The plow frame 3 is connected to the turning axis 18 to be laterally movable by means of a link 23 as well as pin bearings. The front furrow width and the pulling point of the plow may be adjusted via an adjustment center 22 by means of servomotors or spindles. Slide guides for lateral movement of the plow frame are also possible. The rear end of the plow frame 3 may be pivoted further centrally to the axis 18 by means of a pivoting cylinder 24 in order to increase the ground clearance of the raised plow during turning. A further servomotor 25 is provided to pivot the plow frame with parallel adjustment of the cutting width of the individual plow bodies 4, 4'. The pivoting support wheel 2 is laterally pivotable about the axis 19 on the plow frame in the rear region of the plow frame 3. A parallel guide to adjust the cutting width of the individual plow bodies 4, 4' by pivoting about the axis 21, 21' is made possible by a linkage (not shown). The pivoting arm 6 and the support wheel 5 are mounted to rotate about the axis 9, which is inclined with respect to the ground and points forwards. From this pivot bearing, the pivot arm 6 encompasses the tire of the support wheel 5 and dips centrally in its rim. A wheel hub that is not visible is rotatably mounted on the pivot arm 6 within the rim to allow the support wheel 5 to roll on the ground surface. The pitch line of the pivot arm 6 is almost the same as the axis 9, but may slightly deviate therefrom. It is important that the axis 9 approximately intersects the middle plane of the wheel that is vertical to the wheel's running axis, at the level of the ground surface, wherein this intersection point lies in the direction of travel or of the towing tractor at a distance from the wheel contact point.

The use of twin or double wheels is also conceivable, wherein the axis 9 or the above-described middle plane preferably lies centrally between these wheels. Likewise, the intersection point 11 and the wheel contact point 10 are formed at least approximately centrally between these wheels. The pivoting axis 8 of the pivot bearing 12 is at least approximately perpendicular to the direction of travel, but may also be erected further with respect to the longitudinal axis of the plow frame 3 in order to need less pivoting free space with respect to the ground surface. In this case, the at least approximately vertical alignment of the axis 9 with respect to the axis 8 must be compensated for in a complementary manner according to the direction of travel.

Figure 3:
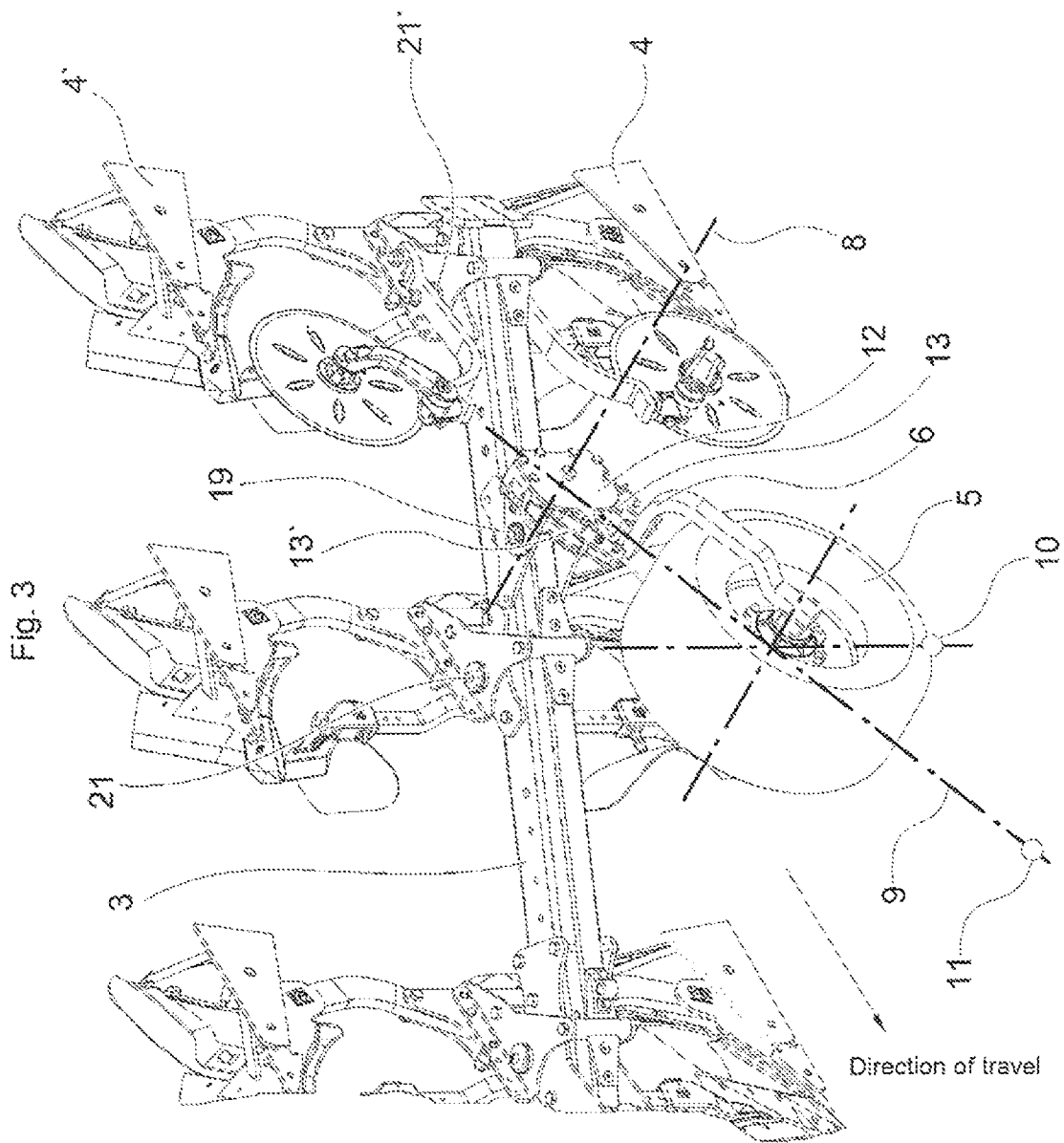
FIG. 3 shows the rear region of a rotary plow construction with a pivoting support wheel in a perspective view.
Figure 4:
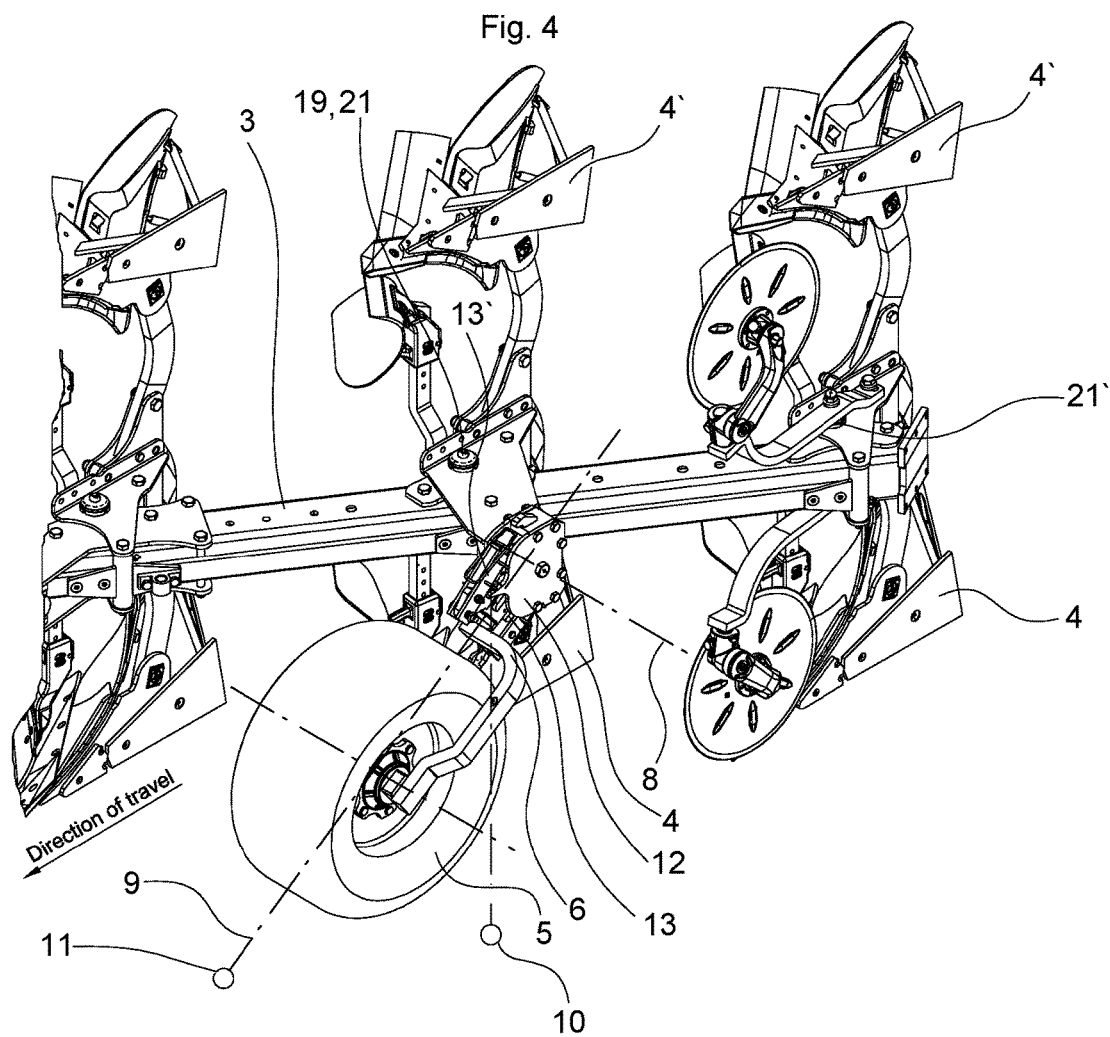
FIG. 4 shows the rear region of a rotary plow construction with a pivoting support wheel in a perspective view, where the arm (6) or its pivot bearing (12) is telescopic or displaceable in the direction of the second axis (9).
Figure 5:
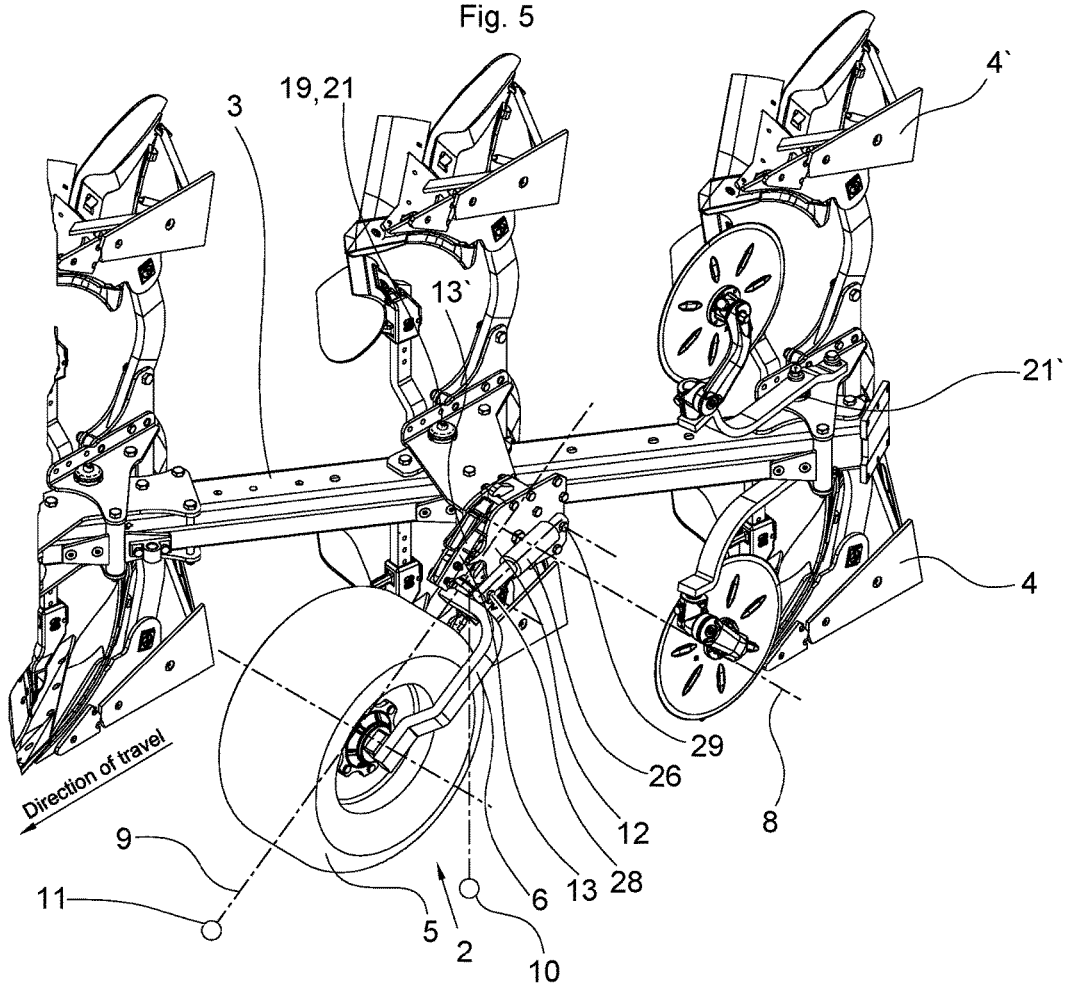
FIG. 5 shows the rear region of a rotary plow construction with a pivoting support wheel in a perspective view, where a third axis (19) about which the pivoting support wheel (2), the pivot bearing (12) or the arm (6) is pivotally mounted, corresponds to pivot axes (21, 21') of a plow body (4, 4') or plow body pair.
Figure 6:
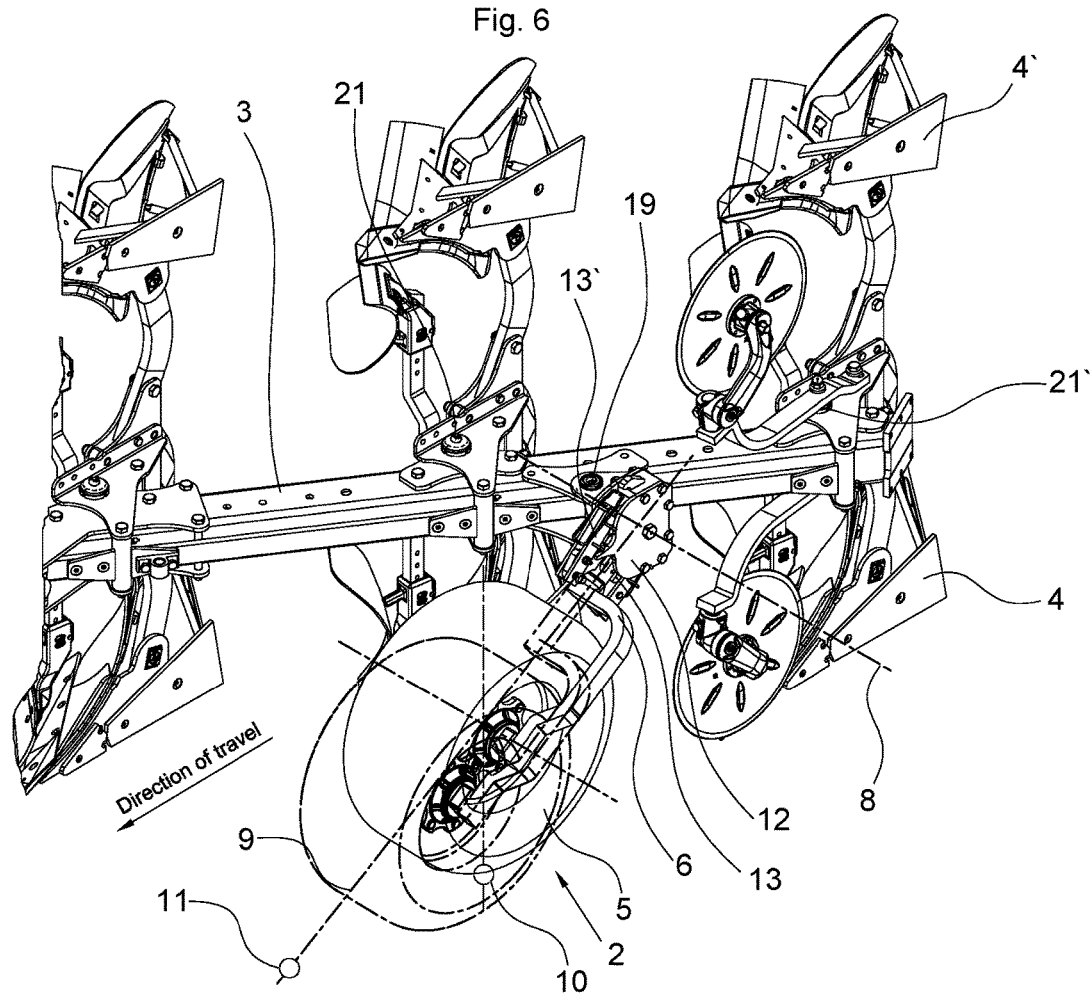
FIG. 6 shows the rear region of a rotary plow construction with a pivoting support wheel in a perspective view, where the pivoting movement of the pivoting support wheel (2) about the first axis and/or the second axis (8, 9) is supported or blocked by at least one external power device.
Figure 7:
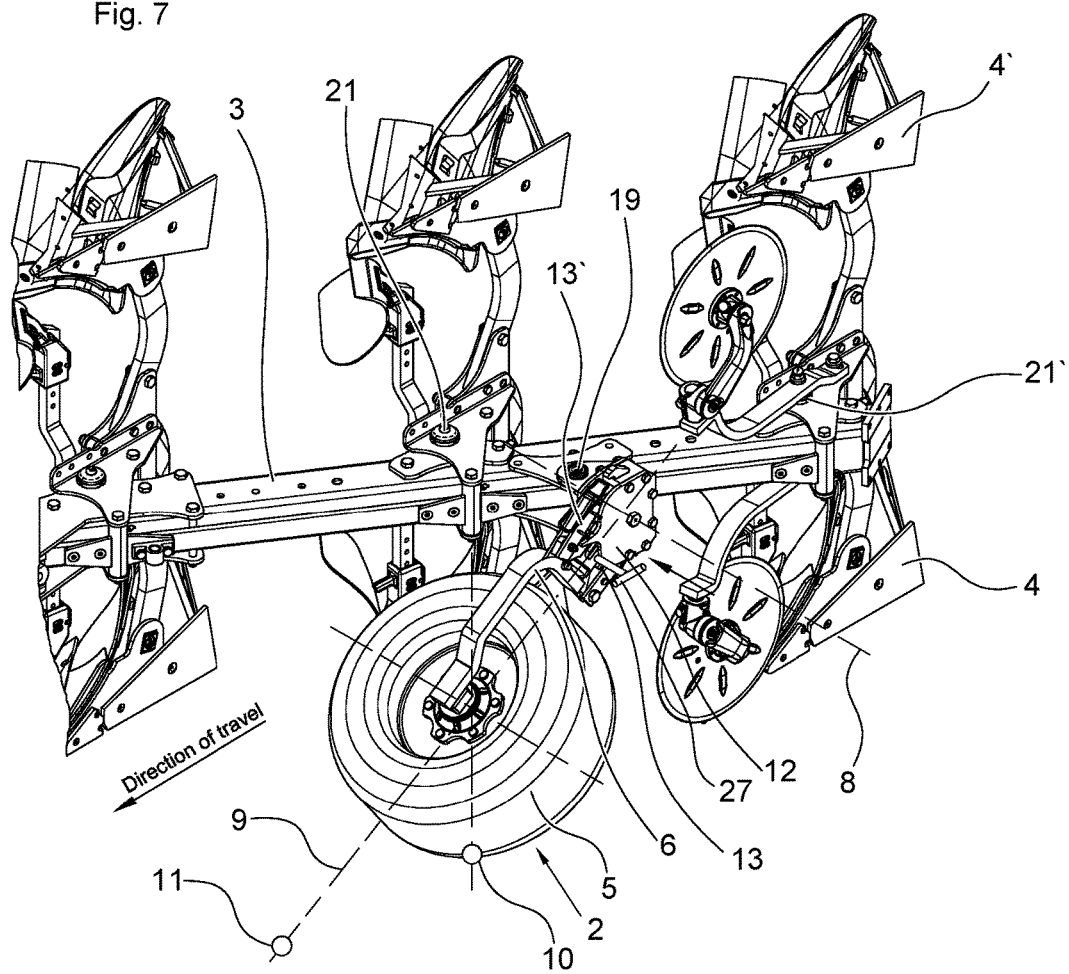
FIG. 7 shows the rear region of a rotary plow construction with a pivoting support wheel in a perspective view, where the movement of the pivoting support wheel (2) or of the arm (6) about the second axis (9) is limited by means of locking means in a position at 90° to a middle position.

FIG. 3 shows the pivoting support wheel 2 with the rear part of the rotary plow 1 in the working position. The pivot bearing is mounted on the plow frame 3 to pivot laterally about the axis 19. The pivoting support wheel 2 may be aligned at an approximately equal angle parallel to the direction of travel corresponding to the angular position of the plow frame 3 relative to the direction of travel. This alignment may be performed manually, for example, by changing over a pin or other adjusting means, or automatically through a parallel guiding device. To a certain extent, a fixed angular position deviating from the direction of travel is also possible, insofar as it may be compensated for by the self-steering or trailing characteristics of the pivoting support wheel 2. This applies to all the axis alignments which influence the function of the pivoting support wheel 2. The plow bodies 4, 4' and their holding brackets are rotatably mounted on the plow frame 3 via the pivoting axes 21, 21'. The plow bodies 4, 4' are aligned in the direction of travel by means of a parallel guide linkage, thus making possible a variable cutting width adjustment of the rotary plow 1 or its plow bodies 4, 4'. Ideally, the pivoting support wheel 2 or its pivot bearing 12 is coupled to this parallel guide or is fastened directly to one of the pivot bearings 21, 21' and likewise aligned in the direction of travel. In the working position shown, the pivoting support wheel 2 is fixed against a limit stop of the pivot bearings 12 by a stop means 13', which is designed as a tiltable stop spindle. When the plow is turned, the stop means 13' falls into an inactive position. The pivoting support wheel 2 may pivot about the axis 8 into an opposing position in which it is fixed again by the opposing stop means 13 serving the same function. Likewise, the use of servomotors, for example an unlockable hydraulic cylinder or other locking means to fix the pivoting support wheel and to preset a working depth of the rotary plow 1 is possible.

The lateral forces which act on the support wheel 51 at the wheel contact point 10 when the rotary plow 1 is in operation, direct the latter in the direction of travel with an effective lever spacing, which is formed between the axis 9 and the wheel contact point 10. The intersection point 11 of the axis 9 with the ground surface thus forms the imaginary guide point, around which the support wheel 5 follows. The support wheel 5 may be a tire with a rim, but also a steel wheel or have a roller shape. The support wheel may also be provided with a circumferential guide web or profile which improves the steering or rolling characteristics on the ground.

There follow three sheets with drawings.

LIST OF REFERENCE NUMERALS

1 Rotary plow
2 Pivoting support wheel
3 Plow frame
4 Plow tool, plow body
5 Support wheel
6 Arm, pivot arm
7 Ground, ground surface
8 Axis, pivot axis
9 Axis, steering axis
10 Wheel contact point
11 Intersection point
12 Pivot bearing
13 Stop means 14 Mounting frame
15 Hydraulic cylinder
16 Coupling point
17 Coupling point
18 Turning axis
19 Axis, pivot axis
20 Middle plane
21 Axis, pivot axis
22 Adjustment center
23 Link
24 Pivot cylinder
25 Servomotor

The invention claimed is:

1. A rotary plow (1) with pivoting support wheel (2) for mounting on a plow frame (3) of the rotary plow (1), wherein the plow frame (3) comprising a plurality of mirror-inverted plow bodies (4, 4') lying opposite one another in pairs, which are brought from a right-hand turning into a left-hand turning position by a rotation of nearly 180°,
wherein said pivoting support wheel (2) is comprised of a support wheel (5) and an arm (6),
wherein said support wheel (5) is pivotably mounted on the plow frame (3) for depth limitation of the plow bodies (4, 4') by means of said arm (6), wherein the arm (6) that is supporting the support wheel (5) is limited in its pivot angle about a first axis (8) parallel to the ground surface (7) or running through a middle plane (20) of the plow frame (3) upon rotating the plow frame (3), and is locked into a right-handed or left-handed position corresponding to the plow orientation following this rotation by an additional device,
characterized in that
the movement of the arm (6) is about the first axis (8) in a driving direction and describes a maximum angle (α) of 160°, wherein the arm (6) or the support wheel (5) is mounted to rotate about a second forwardly-inclined axis (9) which is arranged in a plane running perpendicular to the ground surface (7) and parallel to the driving direction, wherein the second forwardly-inclined axis (9) is arranged in front of a wheel contact point (10) in order to form an intersection point (11) with the ground surface (7), which forms an imaginary guide point, around the driving direction of the support wheel (5).

2. The rotary plow with pivoting support wheel according to claim 1,
characterized in that
the pivoting movement of the arm (6) or of the support wheel (5) about the second axis (9) is respectively offset to the right and left from a middle position by a pivot angle of maximum of 60°.

3. The rotary plow with pivoting support wheel according to claim 2,
characterized in that
the pivoting movement about the second axis (9) from a middle position is respectively limited to a pivot angle of a maximum of 20° outside the middle position.

4. The rotary plow with pivoting support wheel according to claim 1,
characterized in that
the arm (6) is telescopic and comprises a pivot bearing (12) that is displaceable in the direction of the second axis (9) or the arm comprises a pivot bearing (12) that is telescopic.

5. The rotary plow with pivoting support wheel according to claim 1,
characterized in that
the pivoting support wheel (2), a pivot bearing (12) or the arm (6) is pivotable about a third axis (19) which is arranged approximately perpendicular to the ground surface (7) or to a plane of symmetry (20) of the plow frame (4).

6. The rotary plow with pivoting support wheel according to claim 5,
characterized in that
the third axis (19) about which the pivoting support wheel (2), the pivot bearing (12) or the arm (6) is pivotally mounted, corresponds to pivot axes (21, 21') of a plow body (4, 4) or plow body pair.

7. The rotary plow with pivoting support wheel according to claim 1,
characterized in that
means to limit the pivotal speed of the pivoting support wheel (2) or of the arm (6) about the first and/or second axis (8, 9) are arranged on the arm (6) or on the plow frame (3).

8. The rotary plow with pivoting support wheel according to claim 1,
characterized in that
the pivoting movement of the pivoting support wheel (2) about the first axis and/or the second axis (8, 9) is supported or blocked by at least one external power device.

9. The rotary plow with pivoting support wheel according to claim 1,
characterized in that
the movement of the pivoting support wheel (2) or of the arm (6) about the second axis (9) is limited by means of locking means in a position at 90° to a middle position.

10. The rotary plow with pivoting support wheel according to claim 1,
characterized in that
the pivoting support wheel (2) is fastened near or adjacent to the rearwardmost plow body in the direction of travel.

* * * * *